United States Patent [19]
Tatge et al.

[11] Patent Number: 5,293,630
[45] Date of Patent: Mar. 8, 1994

[54] METHOD OF RETURNING A DATA STRUCTURE FROM A CALLEE FUNCTION TO A CALLER FUNCTION FOR THE C PROGRAMMING LANGUAGE

[75] Inventors: Reid E. Tatge, Richmond; Alan L. Davis, Houston, both of Tex.

[73] Assignee: Texas Instruments Incorporated, Dallas, Tex.

[21] Appl. No.: 970,582

[22] Filed: Oct. 26, 1992

Related U.S. Application Data

[63] Continuation of Ser. No. 414,056, Sep. 28, 1989, abandoned.

[51] Int. Cl.$^5$ ............................ G06F 9/45; G06F 9/42
[52] U.S. Cl. ........................ 395/700; 395/650; 364/DIG. 1; 364/280.4; 364/280.5; 364/281.3
[58] Field of Search ........................ 395/650, 700; 364/DIG. 1, DIG. 2

[56] References Cited

U.S. PATENT DOCUMENTS

| | | | |
|---|---|---|---|
| 4,649,480 | 3/1987 | Ohki et al. | 395/700 |
| 4,787,034 | 11/1988 | Szoke | 364/200 |
| 4,992,971 | 2/1991 | Hayashi | 364/900 |

OTHER PUBLICATIONS

Calingaert, P., Assemblers, Compilers, and Program Translation, pp. 61-69 (1979).
Hunter, R., The Design and Construction of Compilers, pp. 162-175 (1981).
Donovan, J., Systems Programming, pp. 469-470 (1972).
Pyster, A., Compiler Design and Construction, pp. 281-295 (1980).
Aho, A., et al., Principles of Compiler Design, pp. 55-65 (1979).
Gries, D., Compiler Construction for Digital Computers, pp. 187-195 (1971).

*Primary Examiner*—Thomas C. Lee
*Assistant Examiner*—Matthew C. Fagan
*Attorney, Agent, or Firm*—Robert D. Marshall, Jr.; James C. Kesterson; Richard L. Donaldson

[57] ABSTRACT

A method of using a computer to execute a computer program, in which a caller portion of the program calls a callee function that returns a data structure. Before the callee function is called, the computer is used to determine whether the structure is to be used, and if so, an address to which the structure is to be returned is determined. The caller passes this address to the called function. The callee executes, and if the structure is to be used, the callee copies the structure to the predetermined address.

13 Claims, 2 Drawing Sheets

METHOD OF RETURNING A DATA STRUCTURE FROM A CALLEE FUNCTION TO A CALLER FUNCTION FOR THE C PROGRAMMING LANGUAGE

This application is a continuation of application Ser. No. 07/414,056, filed Sep. 28, 1989, now abandoned.

TECHNICAL FIELD OF THE INVENTION

This invention generally relates to computer processing, and more particularly to a method for improving the performance of C language functions that return structures.

BACKGROUND OF THE INVENTION

The C programming language is a relatively small and simple language, used for a wide range of applications. C is relatively portable, despite its rich set of low level operations. Implementations of C are available on most computers and operating systems, ranging from supercomputers to microcomputers. The characteristics of C are described in a reference book entitled *The C Programming Language,* by Brian Kernighan and Dennis Ritchie, which is widely accepted by users of C, and its subsequent edition. In very general terms, some basic characteristics are easily identifiable. C supports the use of functions. Argument passing is by value, although a call by reference can be achieved by passing addresses of arguments. Variables can be static, automatic, or external. C is a typed language, supporting a number of data types; for example, integers, characters, and floating point numbers with various lengths. A powerful feature of C is the use of variables to hold addresses in the form of a pointer, which is defined in C as a variable containing the address of another variable. Arrays can be defined to hold a number of items of information of the same data type.

C permits the use of structures, which permit a program to operate on data items of different types together as a unit. As defined by Kernighan and Ritchie, a structure is a collection of one or more variables, possibly of different types, grouped together under a single name for convenience. A C structure is analogous to a "record" of other languages, such as Pascal.

The efficient use of structures is becoming more important with expanding applications of C, notably the use of variations of C for object oriented programming. Yet, a particularly inefficient use of structures has been the manner in which they are returned from functions. Typical programming methods cause all functions that return a structure to be processed in the same manner. An area of memory is statically allocated at link time for storing the structure. The called function copies the returned structure into that area, then the caller copies the returned structure out of that area. This method requires two copies of the structure.

Another problem with the above method for returning structures is that the method is not re-entrant. Some methods have provided for re-entrancy by creating a buffer in the local frame of the caller, passing the buffer address to the caller, and requiring the called function to copy the return structure to the buffer. Nevertheless, this method does not cure the problem of redundant copying.

Thus, a need exists for an efficient way to return structures from functions. A method that eliminates the redundancy of making more than one copy would greatly improve the speed of execution of functions that return structures. Furthermore, in addition to avoiding unnecessary copying, the method should permit re-entrancy.

SUMMARY OF THE INVENTION

One aspect of the invention is a method of using a computer to return data structures from functions. Before the function is called, the caller determines whether the structure is to be used, and if so, determines the address to which the structure is to be returned. The caller passes this address to the called function. The called function executes, and if the structure is to be used, copies the structure to the predetermined address.

Another aspect of the invention is a method of compiling a high level language program, in which a callee function returns a structure to a caller portion of a computer program. The compiler first determines the type of operation to be performed on the returned structure after it is returned to said caller. Then, the compiler determines an address for the returned structure and generates code within the caller to pass the address to the callee. The compiler generates code to call and execute the callee in the usual manner, but also generates code within the callee to copy the structure to the previously calculated address before the callee returns to the caller.

Another aspect of the invention is a compiler for generating assembly code for returning structures from functions. The compiler is programmed to differentiate among operations performed on structures returned from functions. If the structure is to be used, the compiler determines an address for the returned structure. The compiler generates code that will pass the address to the called function and cause the called function to copy the structure to that address.

In a hardware aspect of the invention a processor is programmed to return structures from functions, such that an address for the returned structure is determined before the function is called. A memory device is used to pass the address to the called function.

A technical advantage of the invention is that redundant copying of structures returned from functions is avoided. This more efficient use of structures may encourage their use in other programming languages, which have previously not permitted them.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

Figure 1:
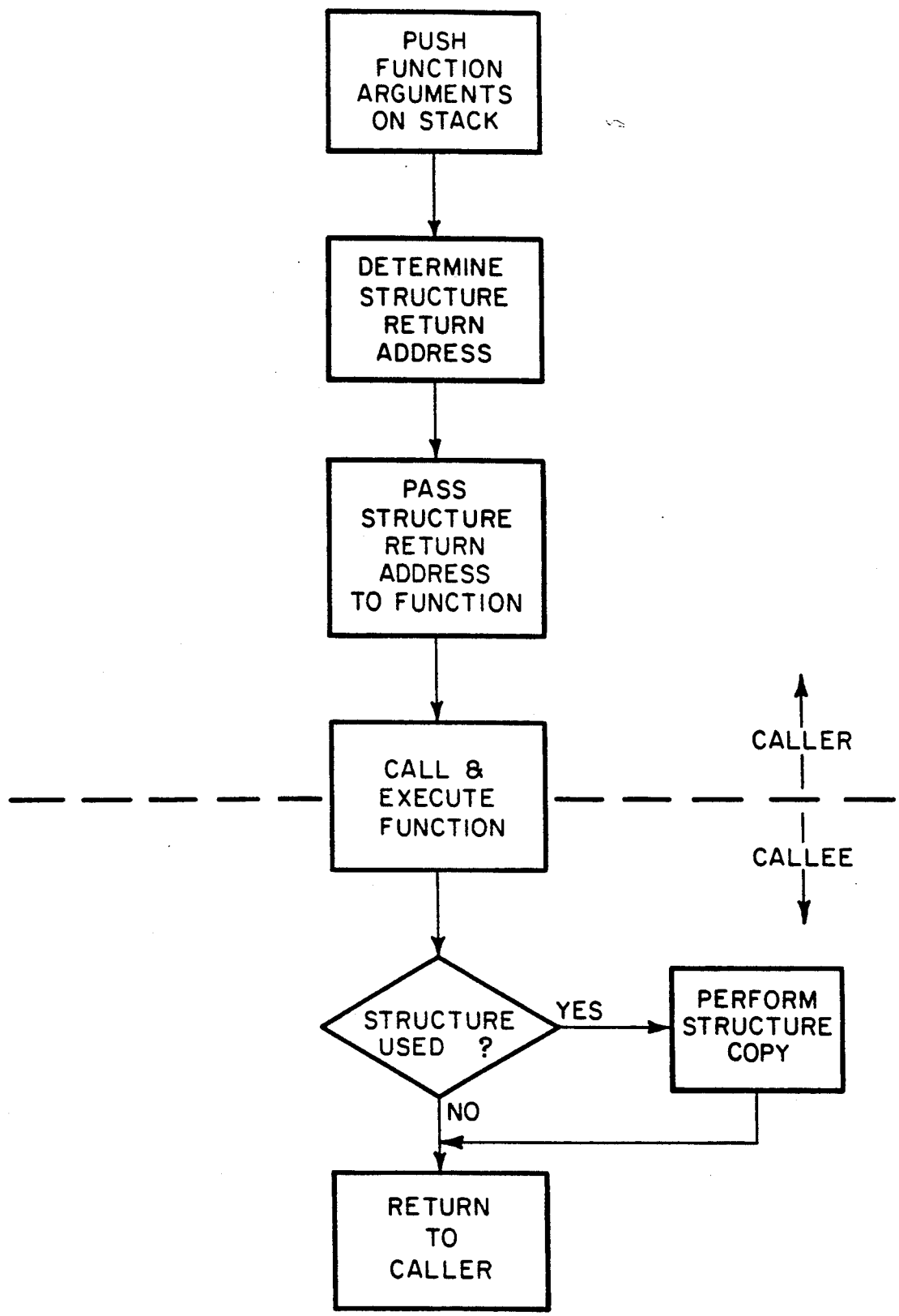
FIG. 1 is a block diagram illustrating the steps of using a computer to return a structure from a function in accordance with the method of the invention.

This invention is directed to efficiently using structures, which are a data type used in the C programming language. The following description is in terms of C, but the same concepts could be applied to any language that allows structures to be returned from functions and directly operates on them. The programming method for implementing the invention is not unique to C, and the programming structure and functionality described herein could be readily translated into another high level language. Specific programs are considered to be within the ability of a programmer having ordinary skill in the art after having reviewed this specification.

In C, a structure is a list of variable declarations enclosed within brackets. The form of a structure definition is:

```
struct optional_type_name {
    type identifier;
    type identifier;
    .
    .
    .
};
```

Variables declared in the structure are called members of the structure. The following is an example of a structure that defines a data type called example:

```
struct example {
    int num;
    char ch;
};
``` in which each variable consists of two elements: an integer called num and a character variable called ch.

In using C functions, three program elements are involved: the function definition, the call to the function, and the function declaration. The function definition is the programming for the function itself, and contains a function declarator that names the function and specifies its return type and arguments. In this description, the function definition is referred to as the "callee". The function call is located in another part of the programming, i.e., the "caller", and causes control to be transferred to the function definition. For purposes of this description, the caller is typically another function, but may be an interrupt service routine or any other programming that uses a function. The function declaration tells the compiler the name of the function, the data type the function returns, if any, and the number and data types of the function's arguments.

Functions may be used to return values, including values of the structure data type. When a function returns a structure, C permits five operations. Assuming the definition:

*struct {int a, b, c, d, e;} x, f();* the following examples illustrate each operation:

1) Assign the entire structure to another structure.

*x=f()*

2) Pass the entire structure to a function as an argument.

*a (f());*

Because C structures are passed by value, the entire structure must be pushed onto the stack.

3) Use a single field of the returned structure.

*x.a=f().a;*

4) Return the returned structure.

*return f();*

5) Do not use the return value.

*f();*

A basic concept of the invention is that, except when the structure will not be used, the above legal operations on a structure returned from a function involves placing the structure in one of several types of memory locations. If the location is determined before the call to the function, redundant copying can be eliminated. The called function will place the structure where it ultimately needs to be, eliminating the need for a structure copy by the caller.

In accordance with this basic concept, FIG. 1 illustrates one aspect of the invention, a method of using a computer to return a structure from a function. In general, the steps begin with using the caller to pass the address of where the returned structure should be placed. The callee is used to return the structure to that location.

More specifically, Step 11 of the method is pushing the arguments of the function to whatever memory device is used to pass the arguments to the callee routine. It should be understood that throughout this description, the memory device used for function arguments and structure return addresses may be a stack or a register or other memory space. In C, the passing of arguments will normally be on the stack, which is used herein for purposes of example.

Step 12 is determining a structure return address. This determination of the address where the returned structure should be placed depends on how the structure will be used, if used at all, by the caller. Using the previous examples of the five permitted operations on structure returns, there are five cases for determining the address:

Case 1: x=f();

In this example, x is a structure and f is a callee that returns a structure. The caller passes the address of x onto the stack and calls f. Function f then copies the return structure directly into x, performing the assignment automatically.

Case 2: a(f());

The return structure is to be passed to another function, thus the area to which the structure will be pushed on the stack can be allocated before the call to f. The address of that area can be passed to f. When f returns, the return structure will appear to have been pushed.

Case 3: x.a=f().a;

In this case, some of the structure is to be discarded. For a generalized solution, however, the entire structure is assumed to be returned. Therefore, an address of a local storage area large enough for the entire structure is passed to the called function. The return structure is then accessed like any other local structure.

Case 4: return f();

The invention requires each function that returns a structure to receive an address to which it must copy its return value. Thus, in this example, the caller already has an address from its caller, i.e., "a destination caller", which it simply passes to the callee. No structure copy is required by the caller, because the callee, f, inherits the structure return address from the caller. Thus, the callee, not the caller, performs the structure copy.

Case 5: f();

If the caller does not use the return structure, an "invalid address", such as a null pointer, is passed onto the stack to the callee.

The invalid address, in addition to being a null pointer, could be any value that represents Case 5.

Step 13 is passing the structure return address to the function just before calling the function. This is done by pushing the address on the stack, or alternatively to a register accessible by the called function. If the function has arguments, the address is simply passed as an extra "argument".

Step 14 is calling the function, which causes the function to execute. Execution includes the usual tasks of the function, such as calculating a return value for the function, if any.

Step 15 is checking the structure return address for validity. This step is required because of Case 5, which implies that each callee that returns a structure must check for a valid pointer before performing any structure copies. If the pointer is invalid, the structure need not be returned, and thus no copy is needed.

The next step depends on the result of Step 15. In Step 16, which applies if the structure is to be used, the callee copies the structure to the memory space represented by the address passed to it in Step 13. The copy is performed immediately before the return, so that there are no side effects such as might be caused by assigning to a global structure. The effect is the same as if the copy were performed by the callee to a buffer and then by the caller to an address, except that the structure is only copied once.

Step 17 is returning to the caller, which occurs immediately after Step 15 if the structure is not used, from which it follows that no copy is needed. On the other hand, if the structure is used, the pointer is valid, a copy is made in Step 16, and Step 17 occurs after Step 16.

Appendix A and Appendix B are examples of one aspect of the invention, which is using assembly code to perform the steps of FIG. 1. Appendix A is high level language code, here written in the C language, and Appendix B is the compiled version of Appendix A. Thus, as indicated by Appendices A and B, the method may be implemented in at least two ways: by programming the steps of the method in assembly language programming, or by programming a compiler to produce the desired assembly language code.

Appendix A declares and defines a function, func(), and declares a function extfunc() and two variables, temp1 and temp2, as being structures, with extfunc() defined elsewhere. Extfunc() returns a structure STR, which contains seven integers. Func() is a caller function, which calls extfunc() five times, each time using the return value of extfunc() in one of the five ways set out in Cases 1-5 above. Appendix A also defines a second function, func2(), which is an example of a function that returns a structure that could be used in another function.

In Appendix B, assembly code illustrates each of the machine level operations associated with the function calls of Appendix A. It can be seen from Appendix B that the machine level language causes the computer to follow the steps of FIG. 1 for each of Cases 1-5 explained above. The compiled code of the function func() set out in Appendix B has six basic parts, labeled as Parts B1-B6, with parts B1 and B6 representing the function's prolog and epilog. Part B1 saves off registers A9 and A11 and allocates memory on stack for local variables. Part B6 deallocates the local memory, restores registers A9 and A11, and returns. The compiled code of func2() has three parts labeled as B7-B9, with the parts B7 and B9 being the prolog and epilog, and Part B8 illustrating the code used to return the structure to the caller.

For each function call in Appendix B, the determination of a memory address for the returned structure is performed in accordance with Step 12 of the method of the invention, as discussed above in connection with FIG. 1. The instructions used in Appendix B are explained in Appendix C, which is a partial list of instructions that are generally similar in nature to instructions used by present day standard microprocessors.

Figure 2:
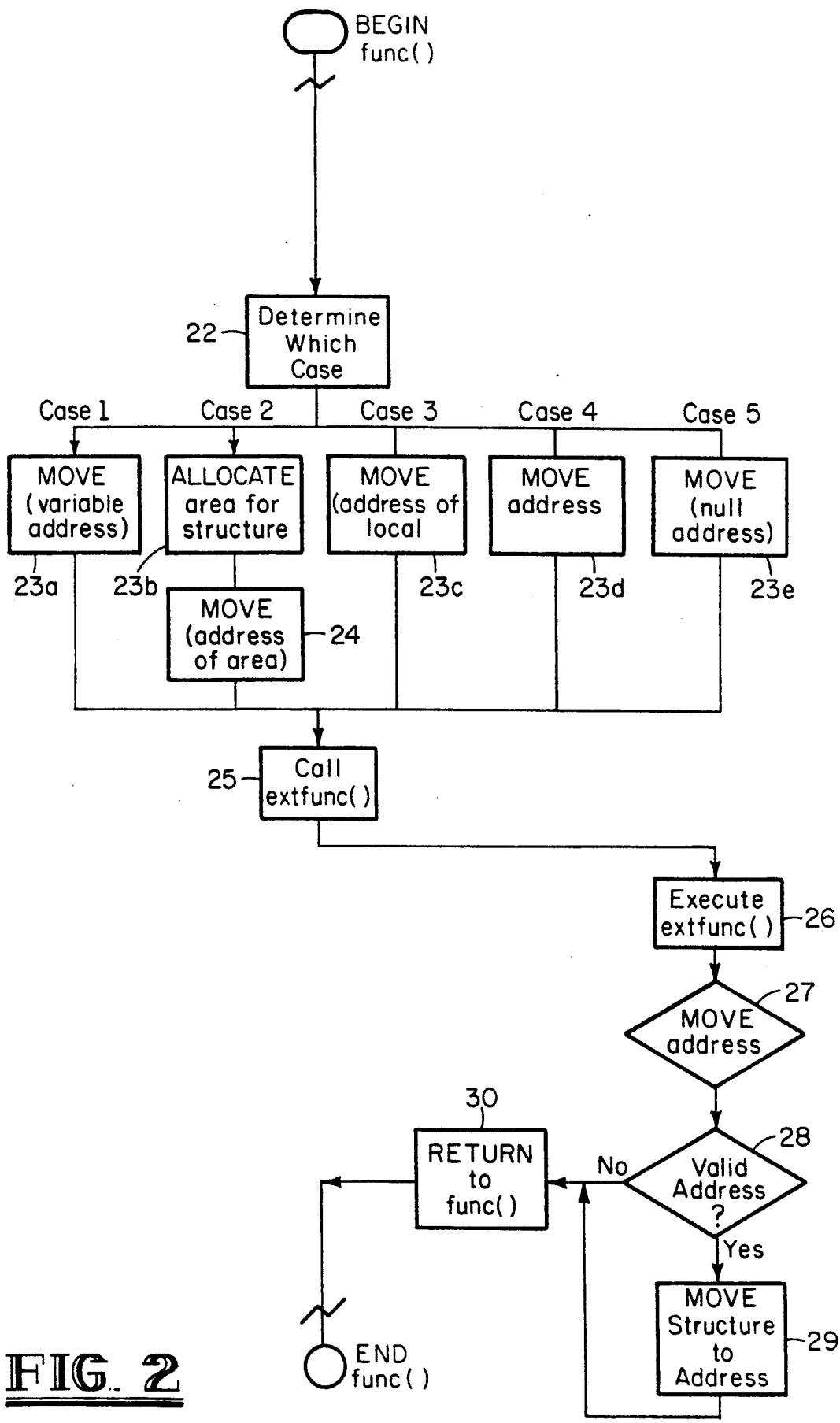
FIG. 2 is a flow diagram illustrating a compiler that will generate code to return structures from functions in accordance with the invention.

FIG. 2 is a flow diagram for a compiler programmed in accordance with the present invention, which generates computer program code to perform structure returns in accordance with the invention. If the method is to be implemented with a high level language, a standard compiler may be modified to incorporate instructions for such generating code. As indicated in FIG. 2, both a caller, func(), and a callee, extfunc(), are programmed to perform certain steps. The compiler generates code consistent with the example of Appendix B.

As indicated by Step 22 of FIG. 2, the compiler examines the caller programming to determine which of the five cases apply to the structure, i.e., Cases 1-5. This can be accomplished by well known recognition techniques.

The next step is generating code that will cause an appropriate address to be passed to the called function. Whether this next step will be Step 23a, 23b, 23c, 23d, or 23e depends on the determination made in Step 22.

Step 23a applies to Case 1 structures, where the structure to which the returned structure is assigned has a specific address in memory. Step 23a is simply generating instructions for passing this address to the callee. By way of example, referring to Part B2 of Appendix B, the address of temp1 is passed to the callee, extfunc().

Step 23b applies to Case 2 structures, where the caller calls a function that will return a structure that will be passed to another function. Step 23b is generating instructions for saving a pointer to where the structure argument will be stored, allocating space on the stack for the structure, and passing this address to the callee. This is possible because the size of the structure is known from its definition. Referring to Part B3 of Appendix B, the structure returned by extfunc() has seven integers, which require 224 bits. The effect of Step 23b is that the return value of extfunc() will be placed on the stack, where it will be an argument for extfunc(). It should be understood that Part B3 is a special case in that extfunc() is called twice for purposes of illustrating two cases. In this connection, one call of extfunc() does not use the return value, thus an invalid pointer is passed, which illustrates Case 5.

Step 23c applies to Case 3 structures, where only part of the returned structure is to be used. Referring to Appendix B, Part B4, space in a local buffer is allocated, to which the callee places the returned structure. After the callee returns, the caller uses the part it needs. Step 23c is generating code consistent with the example of Part B4.

Step 23d applies to Case 4 structures, where the caller, as well as the callee, returns the structure. As discussed above, it can be assumed that the caller already has an address from a destination caller, which it simply passes to the callee. Referring to Appendix B, Part B5 illustrates how extfunc() receives an address from func(). A further example of Case 4 is illustrated in Part B8, in which the returned value is used externally to func2(), thus the callee must copy the structure. Step 23d is generating code consistent with the examples of Parts B5 and B8.

Step 23e applies to Case 5 structures, which are not used. In this situation, the compiler generates instructions to pass an invalid pointer to the callee.

After Step 23a, 23b and 24, 23c, 23d or 23e is performed, in Step 25, the callee calls the called function. This is illustrated in Appendix B by the instruction CALLA.

Within the called function, certain additional steps occur, illustrated in FIG. 2 as Steps 26–30. As with steps 23a–23e, 24, and 25, steps 26–30 are code generating steps, except that the computer is generating callee code rather than caller code. Step 26 is generating code so that the callee begins to execute, which includes receiving its arguments from the stack. Parts of the arguments it receives will be the address for the returned structure, as indicated in Step 27.

Step 28 is generating code so that the callee checks the address to determine if the pointer is valid. Code is generated to conditionally skip the structure copy code if the pointer is determined to be invalid. In this situation, the next step is Step 30, which is generating code to return to the caller.

Step 29 generates copying code for the case where the pointer is valid. The structure copy code is the same, regardless of how the function's return value is used. After the copy is made, Step 30 is generating code so that the callee returns to the caller.

An additional advantage of the invention is that rather than having a static area of memory associated with a function that returns a structure, an address on the stack is used. This eliminates the need to allocate a temporary buffer for a return result. The result is that the method permits the caller and callee functions to be re-entrant.

A hardware aspect of the invention is a computer processor programmed to perform the steps of FIG. 1. The processor is used with any computer system that executes a program in which structures are returned from functions. The system, like other standard computer processing systems, has a host processor, active memory, such a random access memory, input and output circuits, means for internal communications, and various user input and output peripheral devices. The processor of the invention may be the host processor, further programmed in accordance with the invention or a special processor, working in conjunction with the host.

As explained above in connection with FIG. 1, the processor of the invention is programmed to execute instructions of determining whether the structure will be used; instructions for determining an address for said structure before said callee is called; instructions for passing said address to said callee; and instructions for copying said structure to said address before returning from said callee, if said structure is used. The invention also requires memory for allocating passing the address of the returned structure to the callee. As indicated above, the passing will normally be on a stack.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

APPENDIX A

```
typedef struct   { int a,b,c,d,e,f,g; } STR;
extern STR extfunc();
extern STR temp1;
extern STR temp2;
STR func()
{
        temp1 = extfunc();          /* Case 1:   ASSIGN RESULT OF FUNCTION
                                                 CALL */
        extfunc(extfunc());         /* Case 2:   PASS A RETURNED VALUE */
        temp1.b = extfunc().g;      /* Case 3:   USE ONE FIELD IN RETURN
                                                 VALUE */
        return (extfunc());         /* Case 4:   RETURN RETURNED VALUE */
}
STR func2()
{
        return temp1;
}
```

APPENDIX B

```
* C COMPILER                                                                *
FP      .set    A13
STK     .set    A14
        .globl  _extfunc
        .globl  _temp1
        .globl  _temp2
        .globl  _func
```

```
* FUNCTION DEF : _func                                                      *
_func:
        MMTM    SP,A9,A11,FP        ; Part B1
```

APPENDIX B-continued

```
            MOVE    STK,FP
            ADDI    224,STK
* temp1 = extfunc()                    ; Part B2
            MOVI    _temp1,A11
            MOVE    A11,*STK+,1        ; PUSH ADDRESS OF temp1
            CALLA   _extfunc
* extfunc(extfunc());                  ; Part B3
            MOVE    STK,-*SP,1
            MOVE    STK,A8             ; SAVE POINTER TO CALL STACK FOR
                                       STRUCTURE
            ADDI    224,STK            ; ALLOCATE SPACE FOR STRUCTURE
                                       PUSH
            MOVE    A8,*STK+,1         ; PUSH ADDRESS OF RETURN AREA
                                       (on stack)
            CALLA   _extfunc
            CLRS    A8                 ; RETURN VALUE WILL NOT BE USED.
            MOVE    A8,*STK+,1         ; PUSH INVALID POINTER.
            CALLA   _extfunc
* temp1.b = extfunc().g;               ; Part B4
            MOVE    STK,-*SP,1
            MOVE    FP,*STK+,1         ; PUSH ADDRESS OF LOCAL BUFFER.
            CALLA   _extfunc
            MOVE    *FP(192),A9,1      ; PERFORM ASSIGNMENT
            MOVE    A9,@_temp1+32,1
* return extfunc();                    ; Part B5
            MOVE    *FP(-32),*STK+,1   ; PUSH STRUCT RETURN ADDRESS FOR
                                       THIS FUNC.
            CALLA   _extfunc
EPI0_1:                                ; Part B6
            SUBI    256,STK
            MMFM    SP,A9,A11,FP
            RETS    0
            .end
```

**\* FUNCTION DEF : _func2**

```
_func2:
            MMTM    SP,A12,FP          ; Part B7
            MOVE    STK,FP
;>>>>       return temp1;              ; Part B8
            MOVI    temp1,A8
            MOVE    *FP(-32), FP,1
            JRZ     EPIO_2
            MOVK    7,A12
LL6:
            MOVE    *A8+,*FP+,1
            DSJS    A12,LL6
EPIO_2:                                ; Part B9
            SUBK    32,STK
            MMFM    SP,A12,FP
            RETS    0
            .end
```

APPENDIX C

Instruction Set

| Syntax | Operation |
|---|---|
| ADDI IW,Rd,[W] | 16-bit immediate value + R → Rd |
| ADDI IL,Rd,[L] | 32-bit immediate value + Rd → Rd |
| CALLA Address | PC' → TOS<br>Address → PC |
| CLRS Rs | Clear Rs |
| DSJ Rd, Address | Rd − 1 → Rd |
| DSJS Rd, Address | If Rd ≠ 0<br>(disp. × 16) + PC' → PC<br>If Rd = 0<br>go to next instruction |
| JRcc Address | If cc = true<br>disp. + PC' → PC<br>If cc = false<br>go to next instruction |
| MMFM Rs [,reg. list] | If Register n is in the register list<br>*Rs+ → Rn (repeat for n = 0 to 15) |
| MMTM Rd [,reg. list] | If Register n is in the register list<br>Rn − → −*Rd (repeat for n = 0 to 15) |
| MOVE | See MOVE Summary |
| MOVI IW,Rd,[W] | 16-bit immediate operand → Rd |
| MOVI IL,Rd,[L] | 32-bit immediate operand → Rd |
| MOVK K,Rd | K → Rd |
| RETS[N] | *SP → PC (N defaults to 0)<br>SP + 32 + 16N → SP |

APPENDIX C-continued

Instruction Set

| Syntax | Operation |
|---|---|
| SUBI IW,Rd,[W] | Rd − 16-bit immediate value → Rd |
| SUBI IL,Rd,[L] | Rd − 32-bit immediate value → Rd |
| SUBK K,Rd | Rd − K → Rd |

Key:
Rs — Source register
Rd — Destination register
IW — 16-bit (short) immediate value
IL — 32-bit (long) immediate value
RsX,RdX — X half (16 LSBs) of Rs or Rd
RsY,RdY — Y half (16 MSBs) of Rs or Rd
SAddress — 32-bit source address
DAddress — 32-bit destination address
Address — 32-bit address (label)
F — Field select, defaults to 0   F=0 selects FS0 and FE0   F=1 selects FS1 and FE1
K — 5-bit constant
PC' — Next instruction

MOVE INSTRUCTIONS SUMMARY

| | Destination | | | | | |
|---|---|---|---|---|---|---|
| Source | Rd | *Rd | *Rd+ | −*Rd | *Rd/(offset) | @DAddress |
| Rs | X | X | X | X | X | X |
| *Rs | X | X | | | | |
| *Rs+ | X | | X | | | |

APPENDIX C-continued

| Syntax | Instruction Set Operation | | | |
|---|---|---|---|---|
| —*Rs | X | | X | |
| *Rs(offset) | X | X | X | |
| @SAddress | X | X | | X |

A check mark (X) in a box indicates a valid combination of source and destination operands. For example,
MOVE Rs,*Rd(offset)
is a valid form of the MOVE instruction.

What is claimed is:

1. A computer process for specifying an address for returning data in a variable type form of a predetermined structure to a caller function, which declares the returned data in the form of the predetermined structure rather than passes it as an argument, from a callee function, comprising the steps of:

for a call from said caller function to said callee function, determining whether said callee function will return data in the form of the predetermined structure to said caller function;

if said callee function will return data in the form of the predetermined structure, interpreting said caller function to determine whether other data in the form of the predetermined structure already has an address in memory and whether said caller function will use said returned data in the form of the predetermined structure;

if other data in the form of the predetermined structure already has an address in memory, generating a data return address corresponding to said address already in memory;

if other data in the form of the predetermined structure does not already have an address in memory, generating a data return address for said returned data as a new address;

if said caller function will not use said returned data, generating a data return address for said returned data as an invalid address;

commencing execution of said caller function;

passing said data return address to said callee function upon occurrence of the call from said caller function to said callee function; and transferring control to said callee function upon occurrence of the call from said caller function to said callee function.

2. The method of claim 1, wherein said step of passing said data return address comprises passing said data return address as an argument of said callee function.

3. The method of claim 1, wherein said step of generating said data return address for said returned data as an invalid address if said caller function will not use said returned data generates said data return address as a predetermined invalid address.

4. A computer process for returning data in a variable type form of a predetermined structure to a caller function, which declares the returned data in the form of the predetermined structure rather than passes it as an argument, from a callee function, comprising the steps of:

for a call from said caller function to said callee function, determining whether said callee function will return data in the form of the predetermined structure to said caller function;

if said callee function will return data in the form of the predetermined structure, interpreting said caller function to determine whether other data in the form of the predetermined structure already has an address in memory and whether said caller function will use said returned data in the form of the predetermined structure;

if other data in the form of the predetermined structure already has an address in memory, generating a data return address corresponding to said address already in memory;

if other data in the form of the predetermined structure does not already have an address in memory, generating a data return address for said returned data as a new address;

if said caller function will not use said returned data, generating a data return address for said returned data as an invalid address;

commencing execution of said caller function;

passing said data return address to said callee function upon occurrence of the call from said caller function to said callee function;

transferring control to said callee function upon occurrence of the call from said caller function to said callee function;

executing said callee function to generate returned data in the form of the predetermined structure;

determining whether said data return address is a valid address;

if said data return address is valid, copying said returned data in the form of the predetermined structure to said data return address;

if said data return address is not valid, bypassing said copying step; and whether said data return address is valid or not, transferring control to said caller function.

5. The method of claim 4, wherein said step of passing said data return address comprises passing said data return address as an argument of said callee function.

6. The method of claim 4, wherein said copying step is performed immediately before said step of transferring control to said caller function.

7. The method of claim 4, wherein the step of generating said data return address as an invalid address comprises generating a null pointer if said returned data in the form of the predetermined structure will not be used.

8. The method of claim 4, wherein said step of generating said data return address for said returned data as an invalid address if said caller function will not use said returned data generates said data return address as a predetermined invalid address.

9. The method of claim 4, wherein said step of interpreting said caller function comprises determining whether said returned data in the form of the predetermined structure was assigned an address from an assignor structure such that said returned data in the form of the predetermined structure already has an address in memory.

10. The method of claim 4, wherein said step of interpreting said caller function comprises determining whether said returned data in the form of the predetermined structure is to be passed to another function a an argument, and further wherein said step of generating said data return address as a new address comprises allocating an area of a stack for said returned data and generating said data return address as a new address corresponding to said allocated area of said stack.

11. The method of claim 4, wherein said step of interpreting said caller function comprises determining whether only a single field of said returned data in the form of the predetermined structure is to be used by said caller function, and further wherein said step of generating said data return address as a new address comprises generating said data return address as a new address corresponding to an area of free memory large enough for said returned data in the form of the predetermined structure.

12. The method of claim 4, wherein said step of interpreting said caller function comprises determining whether said returned data in the form of the predetermined structure is to be returned by said caller function to a destination caller function such that said returned data in the form of the predetermined structure already has an address in memory.

13. The method of claim 4, wherein said step of interpreting said caller function comprises recognizing at least one of the following operations:

assignment of said returned data in the form of the predetermined structure to an assignor structure;

passing said returned data in the form of the predetermined structure to a callee function as an argument;

assignment of a single field of said returned data in the form of the predetermined structure; or returning said returned data in the form of the predetermined structure to a third destination function.

* * * * *